(12) United States Patent
Hintermeister et al.

(10) Patent No.: US 7,669,139 B2
(45) Date of Patent: *Feb. 23, 2010

(54) PICTORIAL-BASED USER INTERFACE MANAGEMENT OF COMPUTER HARDWARE COMPONENTS

(75) Inventors: Gregory Richard Hintermeister, Rochester, MN (US); Bradley James Lory, Rochester, MN (US); David Walter Mead, Rochester, MN (US); Chee Peh, Kalamazoo, MI (US); Steven Edward Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,699

(22) Filed: Aug. 22, 2008

(65) Prior Publication Data

US 2009/0013258 A1 Jan. 8, 2009

Related U.S. Application Data

(63) Continuation of application No. 09/659,258, filed on Sep. 11, 2000, now Pat. No. 7,512,894.

(51) Int. Cl.
*G06F 3/048* (2006.01)
(52) U.S. Cl. ............... 715/771; 715/734; 715/736; 715/767; 715/853; 715/969; 715/970
(58) Field of Classification Search ............ 715/736, 715/734, 767, 771, 853, 969, 970
See application file for complete search history.

(56) References Cited

U.S. PATENT DOCUMENTS 5,226,120 A 7/1993 Brown et al.

(Continued)

FOREIGN PATENT DOCUMENTS

EP 0687977 A2 12/1995

(Continued)

OTHER PUBLICATIONS

ThinkPad Hardware View Screen Shot, International Business Macines Corporation (as early as 1999).

(Continued)

*Primary Examiner*—Namitha Pillai
(74) *Attorney, Agent, or Firm*—Wood, Herron & Evans, LLP

(57) ABSTRACT

An apparatus and program product utilize a displayed pictorial representation that depicts the actual physical configuration of a plurality of hardware components in a physical computer system to facilitate the collective management of the underlying hardware components. Typically, within such a pictorial representation, a selected status is displayed for multiple of such hardware components, thereby permitting hardware components sharing common attributes or characteristics to be identified in an efficient and intuitive manner, as well as to permit collective management operations to be performed on all selected hardware components. In addition, a pictorial representation may be dynamically generated to represent the physical configuration of a plurality of hardware components within a plurality of computers. In connection with such dynamic generation, the plurality of computers may be accessed to identify the plurality of hardware components that are resident in such computers.

13 Claims, 5 Drawing Sheets

U.S. PATENT DOCUMENTS

| | | |
|---|---|---|
| 5,276,877 A | 1/1994 | Friedrich et al. |
| 5,305,437 A | 4/1994 | Fritze et al. |
| 5,768,552 A | 6/1998 | Jacoby |
| 5,890,204 A | 3/1999 | Ofer et al. |
| 5,956,665 A | 9/1999 | Martinez et al. |
| 6,020,889 A | 2/2000 | Tarbox et al. |
| 6,040,834 A | 3/2000 | Jain et al. |
| 6,167,358 A | 12/2000 | Othmer et al. |
| 6,188,973 B1 | 2/2001 | Martinez et al. |
| 6,384,842 B1 * | 5/2002 | DeKoning et al. .......... 715/734 |
| 6,457,070 B1 | 9/2002 | Droop et al. |
| 6,480,903 B1 | 11/2002 | Voutaz et al. |
| 6,535,227 B1 * | 3/2003 | Fox et al. ................... 715/736 |
| 6,664,985 B1 | 12/2003 | Bormann et al. |
| 7,107,534 B1 * | 9/2006 | de Jong et al. .............. 715/734 |

FOREIGN PATENT DOCUMENTS

WO     WO0007099 A1     2/2000

OTHER PUBLICATIONS

AS/400 Greenscreen Hardware View Screen Shot, International Business Machines Corporation (as early as 1999).

Windows 95 System Properties Dialog Box Screen Shot, Microsoft Corporation (as early as 1995).

Shneiderman, Ben, Designing the User Interface, Massachusetts: Addison Wesley Longman, 1998.

Doyle, J K et al: "The Starserver FT Computer Satisfies Customer Fault Tolerant Computer Needs," AT&T Technology, American Telephone & Telegraph Company, Short Hills, New Jersey, US, vol. 5, No. 4, 1990, pp. 30-35.

* cited by examiner

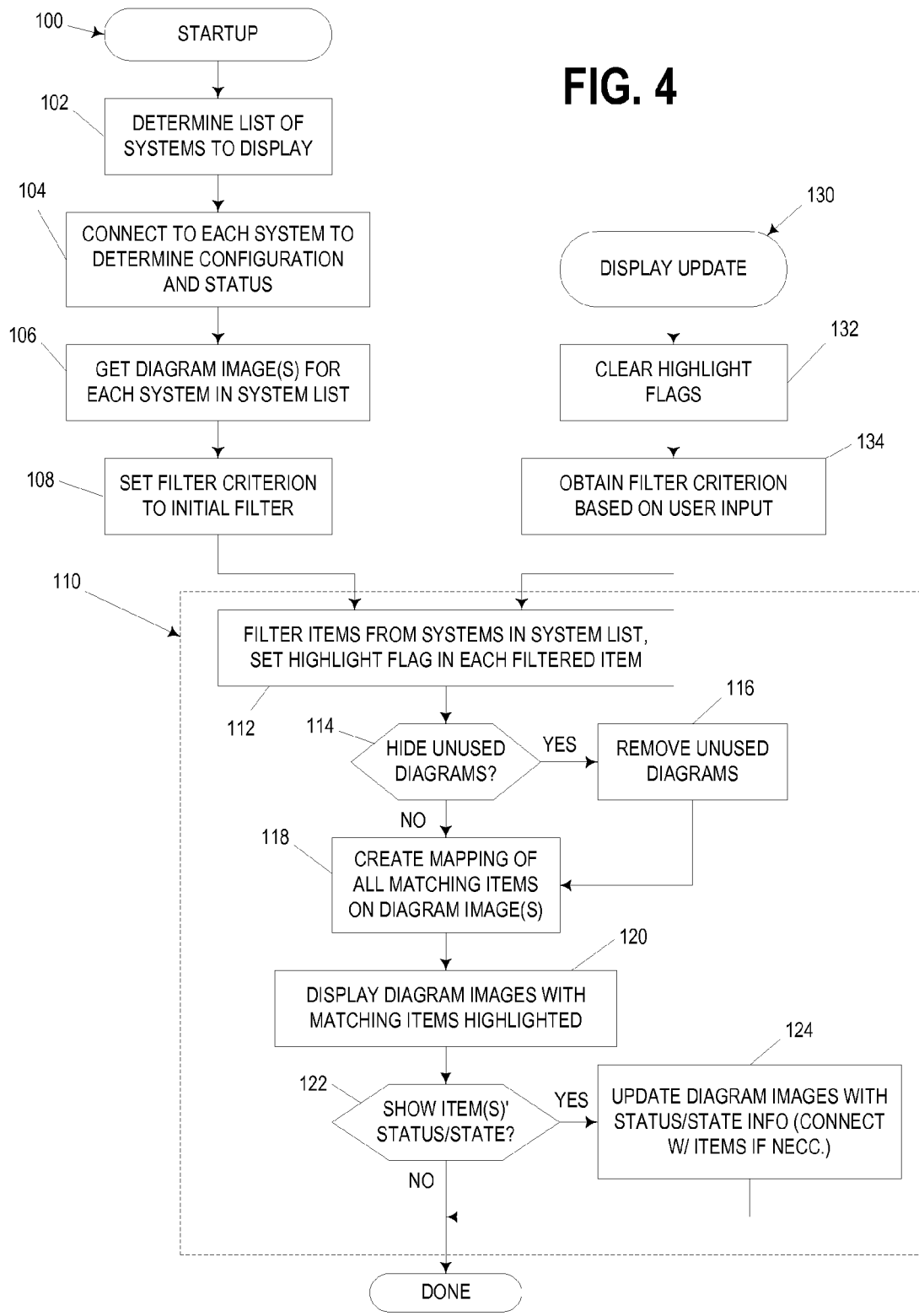

PICTORIAL-BASED USER INTERFACE MANAGEMENT OF COMPUTER HARDWARE COMPONENTS

CROSS-REFERENCE TO RELATED APPLICATIONS

This application is a continuation of U.S. patent application Ser. No. 09/659,258, filed on Sep. 11, 2000, issued as U.S. Pat. No. 7,512,894 B1, by Gregory Richard Hintermeister et al. (ROC920000132US 1), the entire disclosure of which is incorporated by reference herein.

FIELD OF THE INVENTION

The invention is generally related to computers and computer software. More specifically, the invention is generally related to user interfaces for use in managing computer hardware components.

BACKGROUND OF THE INVENTION

Graphical user interfaces (GUI's) have been used with great success to simplify and enhance user interaction with computers. In a GUI environment, a combination of text and graphical objects are displayed on a computer display, with a user able to interact with various objects predominantly through "pointing and clicking" with a user-manipulated pointer controlled by a mouse or similar device. GUI environments are often highly intuitive, as a user is able to perform a desired action on a particular object simply by pointing at the object and initiating a desired action. For example, if a user wants to see the files stored on a particular disk drive accessible via a computer, the user may be permitted to point and click on an icon that represents the disk drive, resulting in the display of a window that lists the drive contents.

One area in which GUI's have been employed is that of hardware component management. Hardware component management is used to manage (i.e., to configure and/or obtain status information about) hardware components in a computer or computer system. Conventional GUI environments often permit users, for example, to select icons associated with particular hardware components to perform management operations on the underlying components. For example, in a GUI environment a user may be permitted to pull up a context-sensitive menu by selecting a disk drive icon to perform operations such as formatting the disk drive associated with the icon. Also, dialog boxes may be accessed via icons to perform more advanced configuration operations on underlying hardware components. In some instances, hardware components may even be grouped together into a "control panel" window or a tree-like representation where icons are arranged hierarchically and grouped by type, e.g., where multiple disk drives are grouped together under a "disk drive" heading.

While GUI-based component managers offer substantial usability improvements over older, more cumbersome text-based component managers, most such GUI-based component managers have been found to be somewhat limited in the ability to inform a user of the underlying physical configuration of a hardware component within a computer system—specifically where in a computer a particular hardware component is physically located. Management of a computer or computer system often incorporates more than simple software configuration; oftentimes a user is required to physically access hardware components to effectively manage the overall system.

Conventional GUI-based component managers typically identify the location of a hardware component by identifying the slot or port to which such a component is connected. Looking at the actual computer, however, specific slots or ports may be difficult to locate, and a user may have difficulty in physically locating specific hardware components in the computer.

Moreover, this problem is significantly greater in complex multi-unit computer systems such as servers, midrange computers and mainframe computers, where the number of manageable hardware components can be overwhelming. For example, some enterprise-level storage systems are capable of housing hundreds of individual disk drives in large physical enclosures, and simply providing a user with a slot location in an enclosure for a particular disk drive may still leave the user with the daunting task of locating that particular slot among hundreds in the physical enclosure. In short, there is little information provided in conventional GUI environments that interrelates the logical location of a hardware component (i.e., with respect to the overall logical or software organization of a computer) with the physical location of the hardware computer in the computer.

In some GUI environments, a displayed pictorial representation of a computer has been used to a limited extent to facilitate management of hardware components in the computer. For example, one conventional GUI environment for a laptop computer displays a pictorial representation of the laptop computer, with icons associated with various external devices capable of being connected to the computer disposed around the periphery of the pictorial representation and visually linked to specific external ports on the computer by lines extending from the icons to the depictions of the ports on the pictorial representation of the computer. Management of the underlying hardware components is performed using the icons, and is limited to interaction via singular icons, and to hardware components located on a single computer. Furthermore, such an environment is typically statically defined for a particular computer design, as the environment is based principally on the ports, rather than the devices that could be connected to those ports.

Despite the additional information with regard to physical location that is provided by the display of a pictorial representation in the aforementioned GUI environment, for more complex managed environments, where potentially hundreds of hardware components need to be managed, a significant need still exists for greater flexibility and usability in terms of GUI-based hardware component management. Therefore, a continued need continues to exist in the art for a GUI-based hardware component management environment offering greater usability, flexibility and functionality than conventional GUI-based environments.

SUMMARY OF THE INVENTION

The invention addresses these and other problems associated with the prior art by providing an apparatus and program product in which a displayed pictorial representation that depicts the actual physical configuration of a plurality of hardware components in a physical computer system is utilized for facilitating the collective management of the underlying hardware components. In particular, within such a pictorial representation, a selected status is displayed for multiple of such hardware components. Such a configuration permits, for example, hardware components sharing common attributes or characteristics to be identified in an efficient and intuitive manner. In addition, such a configuration permits, for example, collective management operations to be performed on all selected hardware components, thus facilitating hardware management tasks where multiple components need to be configured in the same manner, and without requiring that each such component be configured via a separate operation.

In another aspect, a pictorial representation may be dynamically generated to represent the physical configuration of a plurality of hardware components within a plurality of computers. In connection with such dynamic generation, the plurality of computers may be accessed to identify the plurality of hardware components that are resident in such computers. Moreover, management operations may be performed on selected hardware components in response to user input directed to those portions of the pictorial representation that represent the physical configurations of such selected hardware components.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

BRIEF DESCRIPTION OF THE DRAWINGS

FIG. 4 is a flowchart illustrating the program flow of startup and display update routines executed by the component manager resident in the manager computer of FIG. 2.

DETAILED DESCRIPTION

The embodiments described hereinafter may be used to enhance the ability of a user to effectively manage hardware components in a computer system through the use of a unique interactive pictorial display that pictorially represents the actual physical hardware configuration of one or more computers in a computer system. Consistent with the invention, such a pictorial display may be used to configure and manage hardware components on a local computer (i.e., on the same computer that is being managed) or on a remote computer (i.e., coupled to the managing computer over a network or other electronic interface).

Figure 1:
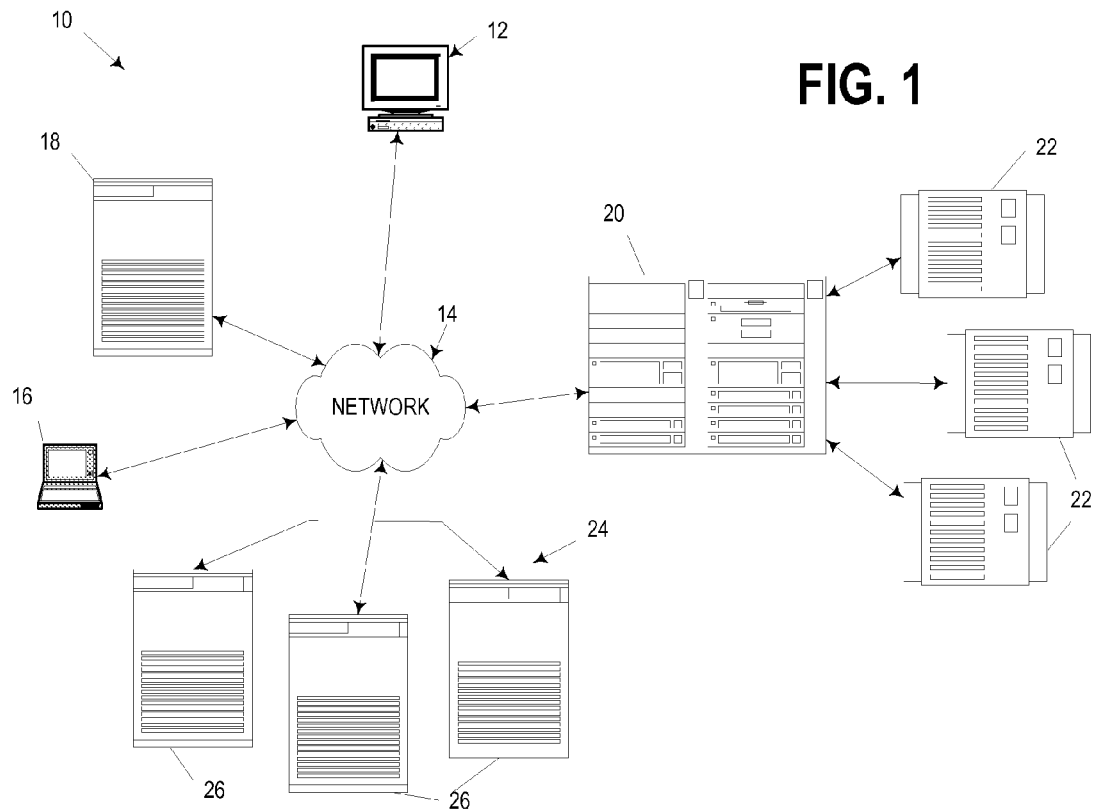
FIG. 1 is a block diagram of a computer system consistent with the invention.

For example, FIG. 1 of the drawings, wherein like numbers denote like parts throughout the several views, illustrates a computer system 10 implementing pictorial-based computer hardware component management consistent with the invention. Computer system 10 includes a manager computer 12 coupled to a network generically represented at 14. Consistent with the invention, manager computer 12 may implement pictorial-based hardware component management of hardware components resident in the manager computer itself, or to one or more other remote computers or electronic devices in computer system 10, e.g., a single-user computer 16, a single-unit multi-user computer 18 such as a minicomputer or server, a multi-unit multi-user system incorporating a computer 20 and one or more supplemental hardware units (e.g., storage towers 22), or even a clustered system 24 including a plurality of cluster nodes 26.

From the illustration in FIG. 1, it will be apparent to one of ordinary skill in the art having the benefit of the instant disclosure that pictorial-based hardware component management may be used to manage practically any electronic device incorporating configurable and/or manageable hardware components. In addition, it will be appreciated that the precise manner in which a managing device and a managed device are interconnected (both with respect to hardware and software interfaces) may vary in different applications. For example, network 14 may represent practically any type of networked interconnection, including but not limited to local-area, wide-area, wireless, and public networks (e.g., the Internet), point-to-point serial or parallel interconnects, etc.

Figure 2:
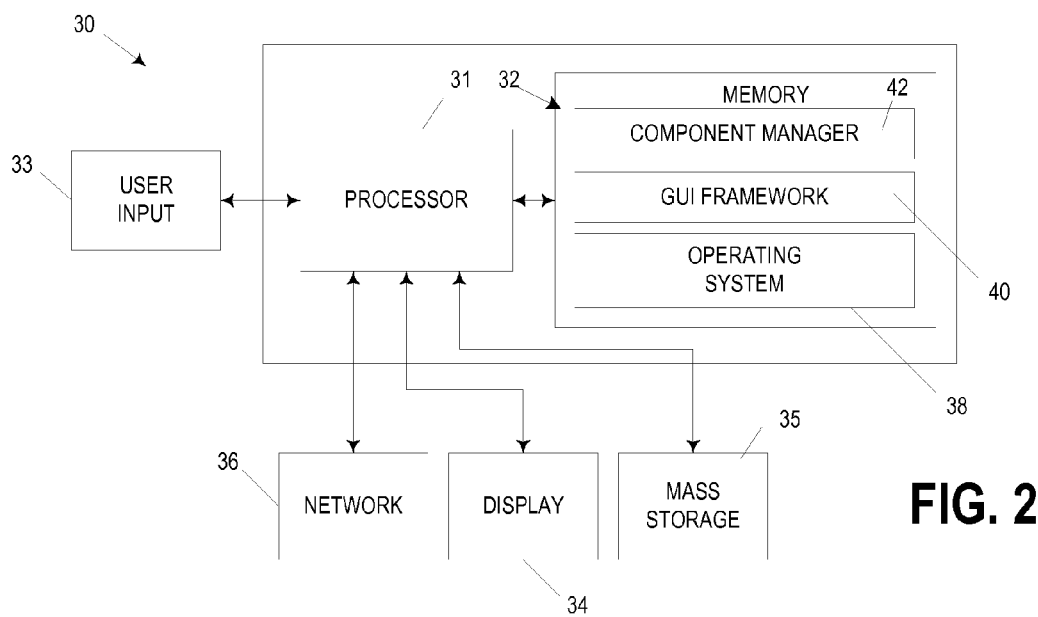
FIG. 2 is a block diagram of an exemplary hardware and software environment for a manager computer from the computer system of FIG. 1.

FIG. 2 illustrates an exemplary hardware and software environment for a manager computer or apparatus 30 consistent with the invention. For the purposes of the invention, apparatus 30 may represent practically any type of single- or multi-user computer, computer system or other programmable electronic device, including a client computer, a server computer, a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., GUI framework 40 and component manager 42, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Pictorial-Based Hardware Component Management

In the illustrated embodiment described hereinafter, pictorial-based hardware component management is implemented within a graphical user interface (GUI) framework implemented via a plurality of objects, e.g., as illustrated at 50 in FIG. 3. An object tree representing the GUI framework is accessible via a root node 52 from which one or more system objects 54 are referenced. Each system object represents a particular computer or computer system accessible via a manager computer for performing component management therewith. Typically, each system object will represent a computer or other electronic unit within which multiple hardware components are mounted or are otherwise resident. As such, each system object may represent, for example, a stand-alone computer, a multi-user computer, a clustered system, or even individual expansion towers or chassis in which hardware components may be mounted.

Each system object includes, among other data, a diagram list 56 that references one or more diagram objects 60. Each diagram object 60 in turn includes an image 62 and an item mapping 64.

Each diagram object represents a distinct pictorial representation of the computer or computer system referenced by the associated system object 54. It should be noted that multiple diagrams may be supported for each system object, with the multiple diagrams providing different viewpoints, e.g., different sides, layers, elevations, levels of zoom, etc. The image data 62 associated with each diagram object represents the actual image data (or a pointer to the location of such data) that will be displayed on a computer display to pictorially depict the associated view of the represented system.

An image may provide a pictorial representation in a number of manners, including two or three dimensional representations, as well as a variety of image types that pictorially represent the actual physical configuration of hardware components within the associated system. Images may be photographic in nature, or may be diagrammatic, e.g., lined and/or shaded drawings representative of the physical configuration of a computer. Moreover, diagrams may be in color, gray scale or black and white. Any other image type that accurately depicts the relative placement and location of hardware components within a computer may be used in the alternative. Images may represent external views of a system and/or may represent internal views within a system. Images may also be comprised of multiple layers that are selectively shown or hidden based upon the types of hardware components of interest.

Diagrams and in particular image information therefor may be provided from a number of sources. For example, such information may be resident in a computer or computer system when shipped. In the alternative, such information may be retrieved from an external source, e.g., over a network such as the Internet. Doing so would permit, for example, a query to be made from a central repository based on a model number or other identifier associated with a particular computer, computer system, or even individual hardware components, with pictorial and/or other information downloaded to the manager computer as needed to provide the appropriate pictorial information for all of the computers/computer systems capable of being managed by the manager computer. As such, were a system operator to add a new computer or component to be managed by an established manager computer, such a query could be used to obtain up-to-date pictorial information for the new computer or component. Moreover, in other embodiments, pictorial information may be provided with particular hardware components, computers, computer systems, etc., e.g., along with drivers or other support software therefor. Doing so would permit, for example, pictorial information to be automatically installed in connection with the installation of an upgraded component or computer to a managed system.

The item mapping for each diagram 60 points to one or more item objects (e.g., item 70) representative of the various hardware components accessible via a diagram object 60. Given that each diagram object identifies the physical configuration and location of a hardware component within the associated image, item mapping 64 also typically includes mapping data that identifies where on the associated image a particular hardware component is depicted. As discussed below, such mapping data enables both pictorial representations of hardware components to be selectively highlighted, and user input directed to a particular hardware component to be identified within an image.

Each item object 70 includes a highlight indicator or flag 72 indicating whether the associated item should be highlighted to represent a selected status of or to represent a particular filter selection criterion for the associated hardware component. In addition, each item object includes one or more attributes for the underlying hardware component for use in performing filtering or searching of hardware components in a manner discussed below. Attributes may provide class or type information about practically any physical, electrical or logical characteristic of the associated hardware component. For example, for a disk drive hardware component, attributes may be used to indicate the fact that the device is a disk drive, the capacity, the amount of free space, the interface type, the speed, the membership of the component in a pool or other grouping of multiple components (e.g., a backup group, a mirrored pair, etc.), the compressed status, the balanced status, the location, the model, the serial number, the configuration settings, etc. For other types of hardware components, the types of attributes stored in the associated item object will, of course, vary.

Figure 3:
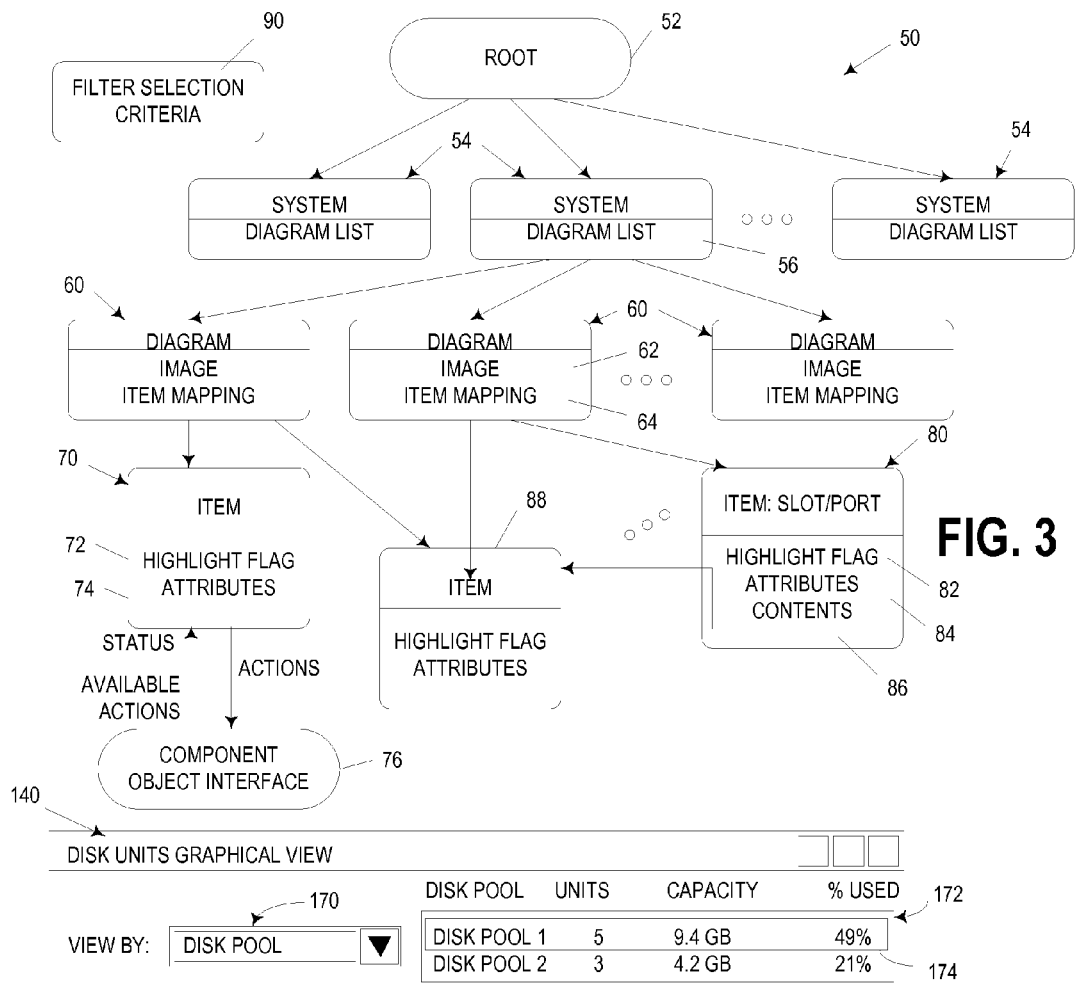
FIG. 3 is a block diagram illustrating a logical organization of objects in a GUI framework resident in the manager computer of FIG. 2.

A predominant function of each item object 70 is to operate as a "wrapper" to the actual management interface for the associated hardware component, represented in FIG. 3 by component object interface 76.

It will be appreciated by one of ordinary skill in the art having the benefit of the instant disclosure that software management of hardware components is well known in the art, and may be implemented through a standardized object-oriented interface through which status information may be obtained from hardware components, and desired management operations may be performed on such components. One such object-oriented management interface is used, for example, in the AS/400 midrange computer available from International Business Machines Corporation. Moreover, through the use of polymorphism, a common interface can typically be provided to a wide variety of different types of hardware components, with the specific functionality required to interact with a particular type of hardware component hidden from higher layers of software, typically within a driver. As an example, conventional hardware management would permit an action such as "format drive" to be initiated on a wide variety of different types of disk drive hardware components, despite the fact that the underlying commands that may be expected by each disk drive may vary in implementation. Therefore, the provision of a generic component object to interface as illustrated in FIG. 3 would be well understood by one of ordinary skill in the art having the benefit of the instant disclosure.

Therefore, each item object is capable in initiating actions on an underlying hardware component. Moreover, each item object is permitted to access status or state information from a hardware component, as well as to obtain a list of available actions from such a component so that the hardware manager is able to determine what actions are appropriate for a given hardware component through a generic component-independent interface.

Each item object 70 may also optionally include one or more image overlays that could be utilized to generate a composite image with the underlying diagram to represent the current configuration of a computer system. For example, a disk drive item object may include an image of the outer casing of the disk drive, with the underlying diagram on the associated diagram object displaying an empty disk drive slot, such that when a disk drive is present in the system, the image presented to a user will include the image of the disk drive casing overlaying the empty slot in the overall diagram of the computer.

FIG. 3 further illustrates a number of optional characteristics of a GUI framework that may be used to expand the functionality of the framework to encompass a wider variety of types of hardware components. For example, item object 80 illustrates a container-type object representing a hardware component such as a slot or port within which other hardware components may be mounted or attached. Therefore, in addition to a highlight indicator 82 and a set of attributes 84, container item object 80 includes a list of contents 86 that reference the components (e.g., item object 88) that are mounted within the designated container. By supporting the hierarchical arrangement of hardware components to incorporate one or more layers of intermediate containers, hardware components may be arranged into hierarchical levels to provide a more accurate representation of the logical organization of hardware components in a computer system. As an example, a disk drive may be housed in a slot within a rack of slots in a tower enclosure. Thus, individual item objects could be used for the disk drive, slot, rack and enclosure to provide separate management of the hardware at each level of detail.

Moreover, by providing container objects separate from the item object for the hardware components that are mounted therein, component management of the actual containers may be performed (if appropriate). Therefore, for example, a slot or port-type container object could be used to configure a slot or port independent of the hardware component mounted therein. Moreover, if a slot, port or other interface component is currently unused (i.e., no other items are pointed to by the contents 86), the underlying component may still be configured via the component manager, and moreover, a user may be permitted to perform actions such as locating all empty interface components of a given type through the GUI framework, installing a component in an unused interface component, etc.

Item object 88 also illustrates an additional but optional concept, where item objects may be referenced by multiple diagram object 60. For example, if two diagram objects represent different levels of zoom of the same view of a computer, the same item object may be accessible via either diagram. Moreover, if the same hardware component is viewable from multiple sides of a computer, the same item object may be utilized to access the underlying hardware component represented in diagrams representing such multiple sides.

FIG. 3 also illustrates a filter selection criteria object 90 that identifies one or more filter criteria used to control the display of the pictorial representation responsive to user input. Object 90 may include a current filter criterion, as well as one or more preset filter criteria such as an initial criterion, as well as any additional criteria stored by a user and representing different "views" of the hardware components capable of being managed by the component manager.

It will be appreciated that other object-oriented frameworks may be utilized in other environments. Moreover, other programming models, including non-object-oriented programming models, may also be used to implement pictorial-based component management consistent with the invention. Therefore, the invention is not limited to the particular implementation discussed herein.

FIGS. 4 and 6-9 illustrate a number of routines executed by component manager 42 of FIG. 2 to implement interactive pictorial-based component management consistent with the invention.

One important aspect of such management is the ability to dynamically generate a pictorial representation based upon which hardware components are accessible to the component manager. As such, in some embodiments the component manager may not need to be configured specifically for a particular type of system and set of hardware components, which is an important benefit given the fact that different computer installations may have a wide variety of hardware configurations, and moreover, the fact that the hardware configuration of a computer installation may change over time as components are added or upgraded.

FIG. 4 illustrates at 100 a startup routine that may be executed during startup of a component manager to dynamically generate a pictorial representation consistent with the invention. Routine 100 begins at block 102 by determining a list of the systems to be represented in a pictorial representation. In the alternative, if component management is being performed for the local computer upon which the component manager is resident, block 102 may not be required. Otherwise, the component manager typically attempts to connect with various systems represented in the system objects of GUI framework 50 to determine what systems are accessible and capable of being managed. It should also be appreciated that in instances of a component manager being unable to communicate with a remote computer, any inaccessible systems may be omitted from the system list generated in block 102.

Next, block 104 connects to each available system to determine the configuration and status of that system. In the illustrated embodiment, for example, it is desirable for each system to return a list of diagram objects 60 (or pointers thereto), as well as the underlying item objects 70 referenced by such diagrams. In some embodiments, any or all of the objects 54, 60 and 70 may be downloaded to the local computer upon which the component manager is executing, or any of such objects may be maintained on remote systems with remote communication (e.g., remote procedure calls) used to implement the functionality described herein on the remote computer. As such, upon completion of block 104, the component manager is capable of determining what diagrams are accessible, as well as what hardware components are represented within each diagram. Implementation of an appropriate protocol to effect such polling by the component manager may take a number of forms, and would be within the abilities of one of ordinary skill in the art having the benefit of the instant disclosure.

Next, block 106 obtains the diagram images for each system in the system list. As an additional step in this operation, the diagram images may be assembled into a composite image as appropriate and placed into a window or other display panel on a computer display.

Next, block 108 sets the current filter criterion to an initial criterion, representing the initial display to be presented to a user. Based upon the initial filter criterion, a filter routine 110 is called, which begins in block 112 by filtering items from the systems in the systems list based upon the filter criterion. The highlight indicator or flag in each item is set or cleared as appropriate to indicate which items meet or do not meet the selected filter criterion. For example, an initial filter criterion might be "show all disk drives", whereby block 112 would search through each accessible item object to identify items having attributes that indicate that such items are associated with disk drives. Any such items would then be updated to a selected status by setting the highlight flag associated therewith. Other items, on the other hand, would be set to unselected status by virtue of clearing the highlight flags associated therewith.

Once the items have been filtered, control passes to block 114 to determine whether a "hide unused diagrams" option is set, indicating whether only diagrams associated with selected items should be displayed. In other embodiments, unused diagrams may never be omitted, or may always be omitted. Moreover, the enabling or disabling of such a feature may be made in response to user input, or may be associated with a particular filter criterion.

If unused diagrams should be hidden, control passes to block 116 to remove any unused diagram—typically by searching through each diagram to locate any diagram for which none of the dependent items linked to that diagram are selected. Control then passes to block 118 to create a mapping of all matching items on the diagram images. Moreover, if unused diagrams are not to be hidden, block 114 passes control directly to block 118.

Block 118 creates a mapping by accessing the item mapping information in each diagram object, which establishes the extents of the depictions associated with the matching or selected items on the diagram images, thereby defining "hot spots" on the diagrams associated with the selected items. In the alternative, mappings may be made of all available items regardless of selected or unselected status, such that a user may interact with any item regardless of whether it is selected by the current filter criterion. Limiting user interaction to selected items, on the other hand, may be beneficial in many instances to simplify the user interface.

Next, block 120 displays the diagram images with the matching or selected items highlighted on the display. Various manners of highlighting may be used, including, distinct colors, shadings, outlines, text fonts, icon overlays, animation, etc. Control then passes to block 122 to determine whether the status or state of each item should be displayed on the pictorial representation. If so, control passes to block 124 to update the diagram images with status and state information for each item, or alternatively, for each selected item only. Block 124 may also require that the component manager connect with the underlying hardware components associated with such items to obtain such status information. A determination of whether to show item status may be made in response to user input, or may be associated with a particular filter criterion. In the alternative, the feature may be omitted, or may be permanently enabled in other embodiments. Providing the ability to display status information would permit, for example, a filter criterion to specify that the amount of free space associated with all available drives be displayed in association with each selected drive, among a wide variety of other status information. Upon completion of block 124, or if item states should not be displayed, routine 100 is complete.

As discussed above, a user may be permitted to selectively update the pictorial representation according to different filter criteria. For example, a user may wish to input a filter or search criterion, e.g., via a dialog box or other user input control, to perform different types of searches on the available hardware components. Also, in addition to the user input of search or filter criterion, a component manager may define one or more predetermined "views" associated with particular filter criterion. For example, for a complex computer system, different views may be defined to view different types of objects, e.g., disk drives, network adaptors, work station controllers, etc., with unique filter criterion associated with each view, so that the same underlying GUI framework may be utilized to manage a wide variety of components in a customized manner. In this manner, the pictorial representation in the underlying GUI framework may be considered to operate much as a computer "anatomy chart", analogous in many respects to a human anatomy chart, where a user might be presented with different views of the same computer much in the same manner a user could look at the skin, muscles, arteries, veins, organs, nervous system of the body, with undesirable or irrelevant layers or components hidden in different views. Moreover, the additional ability to hide unused diagrams permits widely different views to be displayed based upon the context of what information a user is attempting to obtain. For example, a computer system may include a main unit and multiple disk towers, with multiple diagrams showing the different sides of each unit. However, through the use of appropriate filter criteria, if a user is looking at a particular pool of disk units, only one or a subset of the available towers may be displayed, while if a user desires only to access components in the main unit, all disk towers will be hidden from view. It will therefore be appreciated that a great deal of flexibility is provided by the herein-described GUI framework.

Regardless of the mechanism by which a new filter criterion is specified, the component manager also supports the ability to dynamically update the pictorial representation, as represented by routine 130 also shown in FIG. 4. Routine 130 begins in block 132 by clearing all highlight flags of the items in the GUI framework. Then, block 134 obtains a new filter criterion based upon user input—either via the selection of a predetermined view, a stored search or filter criterion, or a manually-input search or filter criterion. Routine 130 then calls filter routine 110 to apply the new filter criterion to the pictorial representation, whereby the above-described flow of routine 110 updates the pictorial representation as appropriate.

Figure 5:
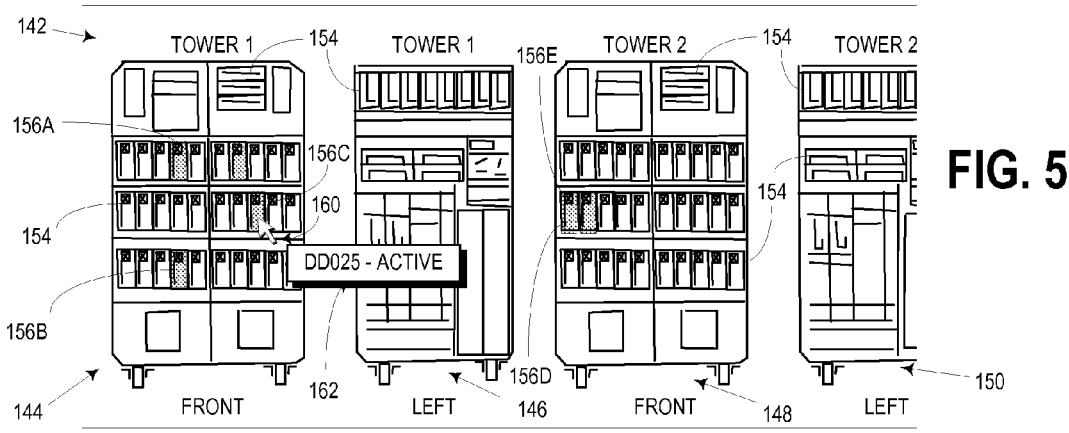
FIG. 5 is a block diagram of an exemplary pictorial view window generated by the startup and display update routines of FIG. 4.

FIG. 5, for example, illustrates an exemplary window 140 displayed on a computer display in representing an exemplary pictorial representation 142 consistent with the invention. Pictorial representation 142 may be generated, for example, by either of routines 100 or 130, and represents a view of the disk units on a multi-user computer such as an AS/400 midrange computer available from International Business Machines Corporation. In the exemplary pictorial representation, it is assumed that the computer system includes multiple disk towers, including a pair of towers designated herein as towers 1 and 2. Additional towers may also be present in the computer system, however, such towers may not include any selected hardware components, and thus may be omitted from the display. It may also be seen that each tower includes a pair of diagrams representing different views of the same tower. For tower 1, diagram 144 represents a front view, while diagram 146 depicts a left side view. Likewise, for tower 2, a diagram 148 displays a front view, while a diagram 150 displays a left side view. A wide variety of hardware components are represented within each diagram as illustrated at 154, with multiple of such hardware components being highlighted or selected in the current view, as represented at 156*a*-156*e*. A pointer 160 is also illustrated, with a pop-up window 162 displayed to show the current status of hardware component 156*c* in response to the pointer moving over the hot spot defined for such component (discussed in greater detail below in connection with FIG. 7).

For the illustrative view, a pull-down menu 170 is illustrated providing a user-selectable list of predetermined views through which a user may view different pictorial representations of the available hardware components accessible via the component manager. The current view depicted in FIG. 5 is that of the disk units, and as such, only diagrams within which active disk units capable of being managed by the component manager are displayed. Moreover, it will be appreciated that window 140 may include additional information in association with a pictorial representation to facilitate the component management of the disk units. For example, a table 172 may be displayed to display status information regarding the various hardware components in the computer system. Table 172 categorizes disk units into pools, and FIG. 5 illustrates via cursor 174 the selection of disk pool 1 so that the individual disk units defined in the logical disk pool are selected or highlighted as illustrated at 156*a*-156*e*. By virtue of the dynamic generation capability of the pictorial-based component manager described herein, if a user selected "disk pool 2" from table 172, the filter criterion would define, at the minimum, that only components that are disk drives incorporated into disk pool 2 should be highlighted. As such, the display would be dynamically updated to highlight those matching disk units associated with such disk pool. It will be appreciated that any number of user interface controls may be utilized to define or modify a particular filter criterion and thereby initiate the dynamic update of a pictorial representation consistent with the invention.

It will be appreciated that in many instances, each diagram will predominantly depict a housing or other enclosure within which hardware components are mounted. For other embodiments, other surrounding hardware may be displayed consistent with the invention.

Figure 6:
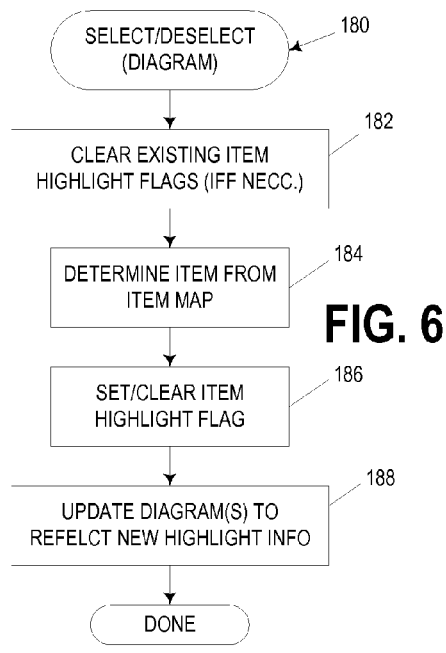
FIG. 6 is a flowchart illustrating the program flow of a select/deselect routine executed by the component manager resident in the manager computer of FIG. 2.

FIGS. 6-9 next illustrate a number of additional functions that may be accessible via the pictorial representation. For example, FIG. 6 illustrates a select/deselect routine 180 invoked with respect to a particular diagram in response to user input directed to select or deselect a particular hardware component. For example, routine 180 may be initiated in response to a user clicking a mouse button while the mouse is disposed over a particular hot spot associated with an item on a particular diagram. Routine 180 begins in block 182 by clearing any existing item highlight flags, if necessary. Next, block 184 determines the item that was selected on the diagram based upon the item map associated with the diagram. Block 186 then sets or clears the item highlight flag associated with the item as appropriate, and block 188 updates the diagram to reflect the new highlight information. Routine 180 is then complete.

It should be appreciated that block 188 may require the updating of multiple diagrams, e.g., if a particular item is visible in more than one diagram. Moreover, it will be appreciated that a wide variety of selection or deselection input actions may be supported consistent with the invention. For example, similar to Windows-based selection features, it will be appreciated that different selection actions, such as multiple select, area select, select all, etc., may be supported consistent with the invention. As an example, additional functions of expanding a selection in response to clicking on the items with the shift or control key depressed on a keyboard may be used to selectively highlight multiple items in a pictorial representation. In other environments, a user may not be permitted to select or deselect certain items, with the selection of items being controlled exclusively by the filter criterion. Other modifications will be apparent to one of ordinary skill in the art.

Figure 7:
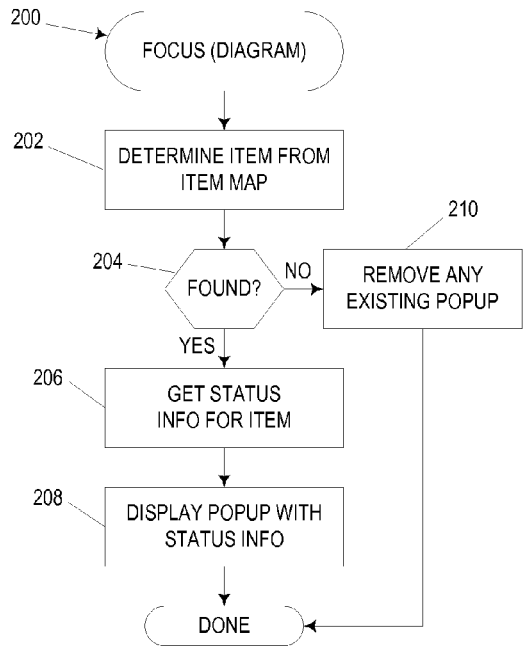
FIG. 7 is a flowchart illustrating the program flow of a focus routine executed by the component manager resident in the manager computer of FIG. 2.

FIG. 7 next illustrates a focus routine 200 directed to a diagram, typically initiated in response to user placement of a pointer within the visible area of a diagram. Routine 200 begins in block 202 by determining which item is in focus based upon the item map associated with the diagram. Block 204 determines whether such an item was found. If so, control passes to block 206 to access the underlying hardware component to obtain status information therefor.

Next, block 208 displays a pop-up with the status information obtained in block 206. It will be appreciated that the status information to be displayed within a pop-up will vary depending upon the type of hardware component. For example, as shown in FIG. 5, status information such as the identity of the component and the active/inactive status of the component may be displayed in a pop-up window 162.

Returning to block 204, if no item is in the item map corresponding to the current position of the pointer, control passes to block 210 to remove any existing pop-up, whereby routine 200 is complete.

Figure 8:
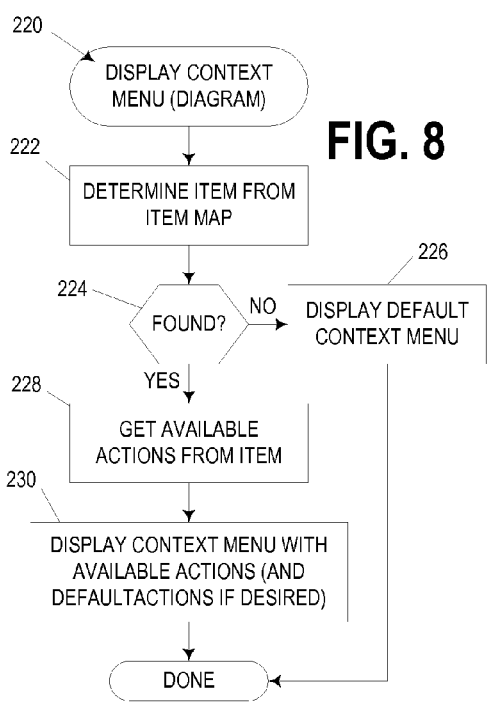
FIG. 8 is a flowchart illustrating the program flow of a display context menu routine executed by the component manager resident in the manager computer of FIG. 2.

FIG. 8 illustrates a display context menu routine 220 directed to a diagram in response to user input directed to that diagram. For example, routine 220 may be initiated in response to a user right-clicking on a particular diagram, or in other manners known in the art.

Routine 220 begins in block 222 by attempting to determine the item in the diagram to which the user input was directed, utilizing the item map defined in the diagram object. Block 224 determines whether such an item was found, and if not, passes control to block 226 to display a default context menu associated with the diagram. If, however, a particular item was found, block 224 passes control to block 228 to obtain the available actions from the item—typically accessing the underlying hardware component to retrieve a list of actions that may be performed with that item. Control then passes to block 230 to display the context menu with the available actions, as well as one or more default actions if so desired. Routine 220 is then complete.

It will be appreciated that different types of hardware components may support a wide variety of different types of actions, and as such, the ability to display a context-sensitive menu in association with a particular item provides an extremely flexible interface through which a user may perform a wide variety of management operations. As an example, for a disk unit, available actions may include operations such as performing virus scans, formatting, de-fragmenting, activating, de-activating, obtaining detailed status information, balancing, removing, replacing, compressing, grouping, reconfiguring, moving, etc. For other types of items, e.g., network adaptors, many of such actions would be inappropriate, and a different set of actions may be supported. Furthermore, implementation of a query interface through which a component manager could retrieve available actions from a component object would be well within the abilities of one of ordinary skill in the art having the benefit of the instant disclosure.

It will also be appreciated that the available actions associated with multiple items may be polled in some instances and displayed on a context-sensitive menu. For example, rather than displaying a default context menu for a diagram when no particular item is specified, the available actions for all items accessible via the diagram may be displayed in a context menu. The list of available actions for all such items may be formatted as appropriate, e.g., to include only operations that may be performed on all items, or to include within different sections of the menu actions that may be performed on all of the relevant items on a particular diagram. As an example, a menu option such as "format all drives on this tower" may be displayed to a user.

Figure 9:
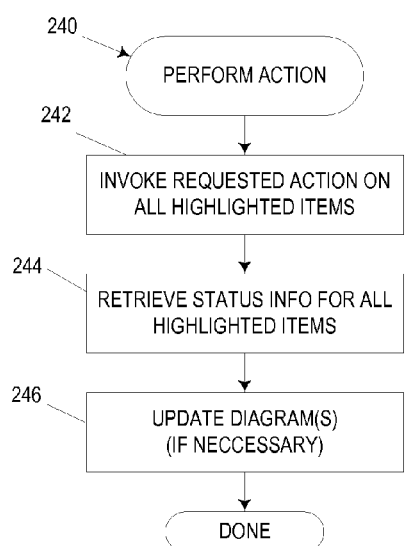
FIG. 9 is a flowchart illustrating the program flow of a perform action routine executed by the component manager resident in the manager computer of FIG. 2.

FIG. 9 illustrates a perform action routine 240 representing another supported functionality of component manager 42, that of performing a collective action on one or more hardware components via the pictorial representation. Routine 240 may be called in any number of situations, e.g., in response to selection of a menu item, depression of a toolbar button, selection of a context menu item, as well as keyboard input, and combinations thereof.

Routine 240 begins in block 242 by invoking the requested action on all highlighted items. It will be appreciated that given the polymorphism supported by the object-oriented GUI framework described herein, the generic component object interface available to each item object will permit the requested action to be invoked on all selected items simply by searching through the GUI framework to identify highlighted items, and then invoking the appropriate action on the associated hardware component(s).

Once the requested action has been invoked, control passes to block 244 to optionally retrieve status information from all highlighted items based upon completion of the performance of the action requested by the user. Next, block 246 updates any diagrams, if necessary, based upon the results of the requested action. Routine 240 is then complete.

Figure 10:
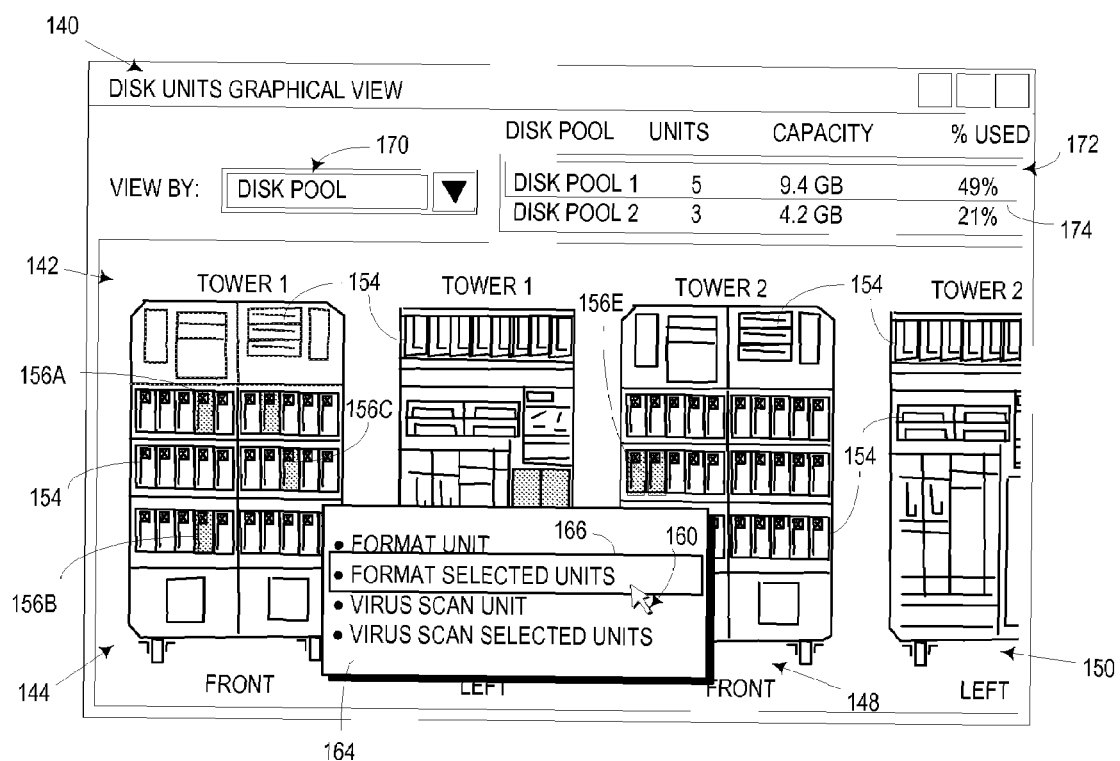
FIG. 10 is a block diagram of the exemplary pictorial view window of FIG. 5, subsequent to display of a context menu and initiation of an action on selected hardware components.

FIG. 10 illustrates, for example, the display of a context menu and the initiation of an action in the manner described above in connection with FIGS. 8 and 9. In particular, assume for example that a user right-clicks on item 156c with the pointer 160 positioned as illustrated in FIG. 5. In response to such user input, a context menu appropriate for the item (here a disk unit) is displayed as shown at 164 in FIG. 10. A variety of available actions may be displayed to a user, including formatting the disk unit, formatting all selected disk units, performing a virus scan operation on the unit or performing a virus scan on all of the selected units, among a wide variety of other component-appropriate actions. As further shown in FIG. 10, movement of pointer 160 over the "format selected units" item 166 on context menu 164 will initiate a format operation on all of the selected items 156a-156e represented in the pictorial representation. It should also be appreciated that, given the generic user interface, the selected disk units may be different types of disk drives, and in fact, each such unit could be provided on a different type of computer platform. This would permit, for example, a format operation to be submitted concurrently for disk units provided on multiple platforms, e.g., Windows NT servers, AS/400 midrange computers, RS/6000 Unix servers, etc.

Various modifications may be made to the illustrated embodiments without departing from the spirit and scope of the invention. For example, in some embodiments, additional information may be overlaid on a pictorial representation. Diagnostic or error information may be displayed in association with a particular hardware component, e.g., via graphics, icons, animation and/or text. Such functionality could permit, for example, a system operator to be notified of failures via flashing representations of failed components.

Other modifications may be made to the illustrated embodiments consistent with the invention. Therefore, the invention lies in the claims hereinafter appended.

What is claimed is:

1. An apparatus, comprising:
    (a) a memory; and
    (b) a program resident in the memory and configured to display a pictorial representation on a computer display, the pictorial representation associated with a plurality of hardware components and representing a physical configuration of each of the plurality of hardware components that conveys a relative placement and location of at least a subset of the hardware components in physical space, wherein each of the plurality of hardware components is associated with at least one attribute, the program further configured to indicate, in response to user input, a selected status for multiple hardware components from the plurality of hardware components within the pictorial representation associated with the plurality of hardware components; to dynamically retrieve a list of available management operations associated with at least two selected hardware components among the multiple hardware components having a selected status after indicating the selected status for the multiple hardware components; to display the list of available management operations within a context sensitive menu after indicating the selected status for the multiple hardware components; and to perform a management operation from among the list of available management operations on all of the multiple hardware components that have a selected status responsive to user input directed to the context sensitive menu, wherein the program is configured to indicate the selected status by selecting a filter criterion from a plurality of predetermined filter criteria, comparing attributes associated with the plurality of hardware components against the selected filter criterion, and selecting those hardware components associated with attributes that match the selected filter criterion, wherein the pictorial representation continues to depict at least one non-selected hardware component after such selection, wherein each of the plurality of predetermined filter criteria is associated with a predetermined view among a plurality of views, and wherein the list of available management operations includes only management operations that are appropriate for being performed on all of the multiple hardware components having a selected status.

2. The apparatus of claim 1, wherein the pictorial representation includes a diagram of at least one enclosure within which the plurality of hardware components is disposed, the diagram further depicting a physical location of each of the plurality of hardware components in the enclosure.

3. The apparatus of claim 2, wherein the first diagram depicts a first view of the enclosure taken from a first viewpoint, and wherein the pictorial representation further includes a second diagram depicting a second view of the enclosure taken from a second viewpoint.

4. The apparatus of claim 2, wherein at least one of the plurality of hardware components comprises an unused interface component configured to physically interconnect with another hardware component, wherein the program is further configured to manage the unused interface component through user input directed to the pictorial representation.

5. The apparatus of claim 1, wherein each of the plurality of hardware components is associated with at least one of a plurality of diagrams, each of which depicting a physical location of at least one of the plurality of hardware components, wherein the program is further configured to display within the pictorial representation only those diagrams from the plurality of diagrams that depict the physical location of at least one hardware component having a selected status.

6. The apparatus of claim 1, wherein the program is further configured to visually highlight those portions of the pictorial representation that depict the physical configurations of the multiple hardware components that have a selected status.

7. The apparatus of claim 1, wherein the program is further configured to update the status of a first hardware component among the plurality of hardware components to one of a selected and an unselected status responsive to user input directed to that portion of the pictorial representation that depicts the physical configuration of the first hardware component.

8. The apparatus of claim 1, wherein the multiple hardware components are physically located in a plurality of computers, wherein the program is further configured to perform the management operation by performing the management operation in each of the plurality of computers.

9. The apparatus of claim 1, wherein the program is further configured to dynamically retrieve the list of available management operations in response to user input directed to that portion of the pictorial representation that depicts the physical configuration of at least one of the at least two selected hardware components.

10. The apparatus of claim 1, wherein the program is further configured to retrieve status information associated with a first hardware component among the plurality of hardware components in response to user input directed to that portion of the pictorial representation that depicts the physical configuration of the first hardware component.

11. The apparatus of claim 1, wherein the program is resident on the same computer as the plurality of hardware components.

12. The apparatus of claim 1, wherein at least one of the plurality of hardware components is physically located on a different computer from that within which the program is resident.

13. A program product, comprising:
(a) a program configured to display a pictorial representation on a computer display, the pictorial representation associated with a plurality of hardware components and representing a physical configuration of each of the plurality of hardware components that conveys a relative placement and location of at least a subset of the hardware components in physical space, wherein each of the plurality of hardware components is associated with at least one attribute, the program further configured to indicate, in response to user input, a selected status for multiple hardware components from the plurality of hardware components within the pictorial representation associated with the plurality of hardware components; to dynamically retrieve a list of available management operations associated with at least two selected hardware components among the multiple hardware components having a selected status after indicating the selected status for the multiple hardware components; to display the list of available management operations within a context sensitive menu after indicating the selected status for the multiple hardware components; and to perform a management operation from among the list of available management operations on all of the multiple hardware components that have a selected status responsive to user input directed to the context sensitive menu, wherein the program is configured to indicate the selected status by selecting a filter criterion from a plurality of predetermined filter criteria, comparing attributes associated with the plurality of hardware components against the selected filter criterion, and selecting those hardware components associated with attributes that match the selected filter criterion, wherein the pictorial representation continues to depict at least one non-selected hardware component after such selection, wherein each of the plurality of predetermined filter criteria is associated with a predetermined view among a plurality of views, and wherein the list of available management operations includes only management operations that are appropriate for being performed on all of the multiple hardware components having a selected status; and
(b) a recordable medium bearing the program.

* * * * *